United States Patent Office 2,743,161
Patented Apr. 24, 1956

2,743,161

PREPARATION OF ANHYDROUS VANADIUM TRIFLUORIDE

David E. Carpenter, Charles P. Johnston, Henry P. House, and Karl O. Johnsson, Oak Ridge, Tenn., assignors to the United States of America as represented by the United States Atomic Energy Commission No Drawing. Application April 27, 1951,
Serial No. 223,453

1 Claim. (Cl. 23—88)

Our invention relates to an improved process for producing vanadium trifluoride and more particularly to the conversion of vanadium trioxide ($V_2O_3$) to substantially pure, anhydrous vanadium trifluoride ($VF_3$).

High purity, anhydrous $VF_3$ is required in various processes, such as, for example, the manufacture of ductile vanadium metal using a bomb reduction method with calcium as the reductant. In the latter method, it is essential to utilize $VF_3$ of extremely low water content, one reason being that excessive pressures might occur in the reduction bomb if too much water is present. Thus, a water content of less than about two percent is greatly desired.

It has been proposed that vanadium trifluoride be prepared by dissolving the reduced oxide ($V_2O_3$) in an aqueous solution of hydrofluoric acid and evaporating to dryness. This process appears unsatisfactory for large scale production since it involves the evaporation of large quantities of acid, and considerable hydrolysis of the $VF_3$ product occurs during the final drying step. Various other methods utilizing anhydrous, gaseous reagents have been tried. For example, we have passed gaseous, anhydrous HF directly over $V_2O_3$ at relatively elevated temperatures. However, even prolonged treatment at these temperatures resulted in incomplete conversion of the oxide, particularly where plant-scale batches were involved, and the reactor products caked badly and were difficult to handle. It appears that these difficulties are in part due to the entrapment, in some unknown manner, of some of the water of reaction in the product material. This water is extremely difficult to remove.

An object of our present invention, therefore, is to provide an improved method for converting $V_2O_3$ into substantially pure, anhydrous $VF_3$.

A further object is to provide a process for converting plant-scale batches of $V_2O_3$, in an economically feasible manner, to pure, anhydrous $VF_3$.

A still further object is to produce a $VF_3$ product which is suitable for use in a calcium bomb reduction process for making vanadium metal.

Additional objects and advantages of our invention will be apparent from the following description.

In accordance with our present invention, $V_2O_3$ may be converted to pure, anhydrous $VF_3$ in high yields by treating the $V_2O_3$ with substantially anhydrous hydrogen fluoride for a suitable period at a temperature below approximately 100° C. and contacting the resulting $VF_3$ hydrate with a dry, inert gas at relatively elevated temperatures, for a suitable period.

The word "inert" as employed in this specification, and the claim appended hereto, is to be construed as designating gases unreactive with the solid $VF_3$ product. Thus, gases such as HF, He, $CO_2$, and A fall within the scope of the term "inert" as used herein, while $O_2$ and $N_2$ which, under the conditions utilized in our reaction, react with $VF_3$ to some extent, to form the oxide and nitride respectively, would not be suitable.

Despite the fact that water is undesirable in the final product, we find that unexpectedly satisfactory results may be achieved by deliberately retaining substantially all the water of reaction during the hydrofluorination step in the form of a hydrate in the manner herein described. The subsequent dehydration step then proceeds smoothly to completion. Thus, these anomalous appearing steps combine to produce the resulting relatively pure, anhydrous product not achievable by more obvious appearing methods, and without the formation of intermediates that cake badly or are difficult to handle. Furthermore, our process requires the use of only one reaction vessel.

We, therefore, find that an unexpected improvement in operation and in the quality of the final product may be obtained by first hydrofluorinating $V_2O_3$ under low temperature conditions which permit the formation of a $VF_3$ hydrate, having the approximate analysis $VF_3 \cdot 3H_2O$, and subsequently drying the latter to anhydrous $VF_3$. Thus, improved hydrofluorination results may be obtained at temperatures of approximately −40° C. to approximately 100° C. We also find it beneficial to introduce into the reaction zone a relatively small amount of water in addition to that formed by the reaction, especially when utilizing a temperature range of about 50° C. to about 100° C. for the hydrofluorination reaction. As progressively lower temperatures are utilized, the presence of moisture becomes less beneficial until, when operating below approximately 50° C., the beneficial effect of such added water is no longer noted.

Thus, it is generally preferred to wet the $V_2O_3$ with approximately 20 percent water by weight when utilizing hydrofluorination temperatures of about 50° C. to about 100° C. If a temperature below 50° C. is chosen, it is desirable to operate in the liquid HF range, and preferably at a temperature of approximately 10° C., without adding any water.

Although many suitable systems may be utilized to effect our invention, we find it particularly advantageous to use a dynamic system involving continuously passing HF through the $V_2O_3$ bed. We find that this may be most efficiently achieved by using a long tube type of reactor. In this type reactor, the through-put of HF necessary for obtaining substantially complete conversion approaches a stoichiometric minimum.

Too rapid a flow rate through the reactor may result in low yields and in inefficient reaction, since considerable HF may pass through the reactor before being consumed. Thus, for example, suitable flow rates are from approximately 6.5 grams/hour/inch$^2$ reactor cross-section to approximately 8.5 grams/hour/in.$^2$ reactor cross-section, while a flow rate of approximately 8.0 grams/hour/in.$^2$ reactor cross-section is preferred.

The length of time at any particular flow rate is dependent upon the quantity of $V_2O_3$ being fluorinated, since, assuming 100 percent efficiency, the flow rate must be maintained long enough to contact the $V_2O_3$ with at least a stoichiometric quantity of HF. Thus, for a tubular reactor containing about 32.0 grams of $V_2O_3$/in.$^2$ reactor cross-section, the flow rate of about 8.0 grams of HF/hour/in.$^2$ reactor cross-section should be maintained for approximately 4 hours for good yields and for substantially complete conversion.

When employing the reaction conditions described above, the product obtained has the approximate analysis $VF_3 \cdot 3H_2O$. We find that suitable dehydration of this compound to $VF_3$ and removal of the resulting $H_2O$ may be achieved by contacting the hydrate at a temperature of approximately 250° C. to approximately 600°

C. in a dry, inert gas, such as, for example, HF, He, A, or $CO_2$. However, if HF is utilized for high temperature dehydration, any residual, adhering HF should be removed with a sweep of an anhydrous, inert gas since, in addition to being corrosive, anhydrous HF has a strong affinity for moisture, which is undesirable in the final product. However, HF is the preferred high temperature dehydration gas, for it appears to prevent the hydrolytic decomposition of $VF_3$. Since HF is relatively expensive, we find that a considerable saving may be achieved by first drying the $VF_3$ hydrate with a less costly gas, such as dry He or $CO_2$ at a lower temperature, for example 250° C., thereafter finishing the dehydration with HF at a higher temperature, for example 550° C., and finally purging residual HF with additional anhydrous inert gas.

Suitable flow rates for any of the dehydrating gases referred to above are from approximately 5.6 grams to approximately 8.0 grams/hr./in.$^2$ reactor cross-section while a flow rate of approximately 7.2 grams/hr./inch$^2$ reactor cross-section is usually preferred, the flow in any case being maintained until substantially complete dehydration is achieved.

In a preferred procedure for carrying out the conversion of $V_2O_3$ to $VF_3$ in accordance with our invention, the $V_2O_3$ charge is placed in an HF resistant, tubular type, rotary reactor which is about twice as long as its diameter. The reactor is maintained at a temperature of about 10° C. during the fluorination step by suitable cooling means. Anhydrous HF gas is introduced into one end of the reactor at a rate of approximately 8.0 grams/hr./in.$^2$ reactor cross-section.

When the reaction appears to be complete, the reactor is brought in contact with a heating means, and anhydrous HF gas is passed through the $VF_3$ hydrate at a rate of approximately 7.2 grams/hr./in.$^2$ reactor cross-section at a temperature of approximately 500° C. until the $VF_3$ hydrate is substantially completely converted to anhydrous $VF_3$.

The reactor is then cooled to room temperature and purged with He gas to remove adhering HF.

The following specific example illustrates our invention in greater detail.

Example

About 1.6 kilograms of $V_2O_3$ were loosely packed into a nickel reactor, 8 inches in diameter and 14 inches long, and which was fastened on each end to 2-inch pipe sections which served as gas inlet, outlet, and journals. The 2-inch pipes turned in stationary bushings and packing glands held rigid by supporting frameworks. An electrically heated furnace surrounded the reactor, so arranged that it could be removed during operation. The reactor was cooled by rotating it in a cooling bath. While the reactor was thus maintained at a temperature of 10° C., anhydrous hydrogen fluoride gas was condensed on the dry vanadium trioxide, using a flow rate of 400 grams per hour for four hours.

Excess hydrogen fluoride was then boiled off and the resulting $VF_3$ hydrate dried at 500° C. for five hours, using an atmosphere of anhydrous hydrogen fluoride gas maintained by a flow rate of 350 grams per hour.

The $VF_3$ product was cooled to room temperature and purged with helium gas to remove adhering hydrogen fluoride. The $VF_3$ was then removed and ground in an anhydrous atmosphere.

This run yielded a final product with an average F/V ratio of 2.93 with moisture content averaging 0.97 percent.

In general, it may be said that the above example is merely illustrative and should not be construed as limiting the scope of our invention which should be understood to be limited only as indicated by the appended claim.

What is claimed is:

An improved method for producing substantially anhydrous vanadium trifluoride from vanadium trioxide which comprises contacting said vanadium trioxide at a temperature below approximately 100° C. with anhydrous hydrogen fluoride until said vanadium trioxide is substantially completely converted to a vanadium trifluoride hydrate and contacting the resulting hydrate at relatively elevated temperatures with anhydrous hydrogen fluoride.

References Cited in the file of this patent

UNITED STATES PATENTS

| | | |
|---|---|---|
| 1,536,291 | Glessner | May 5, 1925 |
| 1,880,505 | Smith | Oct. 4, 1932 |
| 2,131,447 | Logan | Sept. 27, 1938 |

FOREIGN PATENTS

| | | |
|---|---|---|
| 605,472 | Great Britain | July 23, 1948 |

OTHER REFERENCES

Mellor: Comprehensive Treatise on Inorganic and Theoretical Chemistry, vol. 9, page 796. Longmans, Green and Co., New York.